United States Patent
Zhang et al.

(10) Patent No.: US 10,897,204 B2
(45) Date of Patent: Jan. 19, 2021

(54) CONTROL METHOD AND CONTROL CIRCUIT FOR IMPROVING DYNAMIC RESPONSE OF SWITCHING POWER SUPPLY

(71) Applicant: Silergy Semiconductor Technology (Hangzhou) LTD, Hangzhou (CN)

(72) Inventors: Shaobin Zhang, Hangzhou (CN); Yongjiang Bai, Hangzhou (CN); Zhiliang Hu, Hangzhou (CN); Qiukai Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 228 days.

(21) Appl. No.: 15/958,207

(22) Filed: Apr. 20, 2018

(65) Prior Publication Data

US 2018/0241314 A1  Aug. 23, 2018

Related U.S. Application Data

(63) Continuation of application No. 14/793,976, filed on Jul. 8, 2015, now Pat. No. 9,966,856.

(30) Foreign Application Priority Data

Jul. 17, 2014  (CN) .......................... 2014 1 0340366

(51) Int. Cl.
    *H02M 3/335*  (2006.01)
    *H02M 3/156*  (2006.01)
(52) U.S. Cl.
    CPC ... *H02M 3/33507* (2013.01); *H02M 3/33576* (2013.01); *H02M 2003/1566* (2013.01)

(58) Field of Classification Search
    None
    See application file for complete search history.

(56) References Cited

U.S. PATENT DOCUMENTS

| | | | |
|---|---|---|---|
| 7,239,532 B1 * | 7/2007 | Hsu ................... | H02M 3/33523 363/21.12 |
| 8,582,323 B2 | 11/2013 | Berghegger | |
| 8,913,404 B2 | 12/2014 | Xu | |
| 2013/0250627 A1 * | 9/2013 | Herfurth ........... | H02M 3/33507 363/21.15 |
| 2013/0272036 A1 * | 10/2013 | Fang ................. | H02M 3/33507 363/21.17 |

(Continued)

*Primary Examiner* — Jue Zhang
*Assistant Examiner* — Henry E Lee, III
(74) *Attorney, Agent, or Firm* — Michael C. Stephens, Jr.

(57) ABSTRACT

A method of controlling an isolated converter can include: (i) sampling and holding an output voltage of the isolated converter during a present switching cycle to generate a reference voltage signal that is proportional to the output voltage; (ii) comparing, in a predetermined time interval before a next switching cycle, the output voltage against the reference voltage signal, and activating a wake-up signal when the output voltage is less than the reference voltage signal, in order to control a voltage at a secondary winding to represent a variation of the output voltage; (iii) detecting a voltage of the primary winding or the secondary winding, and generating a voltage detection signal; and (iv) controlling the power switch according to the voltage detection signal, in order to maintain the output voltage as an expected voltage.

23 Claims, 5 Drawing Sheets

(56) References Cited

U.S. PATENT DOCUMENTS

| 2014/0016359 A1* | 1/2014 | Telefus | H02M 3/335 363/16 |
| 2014/0139196 A1 | 5/2014 | Chen | |
| 2014/0176107 A1 | 6/2014 | Yu et al. | |
| 2015/0244276 A1* | 8/2015 | Li | H02M 3/33507 363/21.17 |

* cited by examiner

CONTROL METHOD AND CONTROL CIRCUIT FOR IMPROVING DYNAMIC RESPONSE OF SWITCHING POWER SUPPLY

RELATED APPLICATIONS

This application is a continuation of the following application, U.S. patent application Ser. No. 14/793,976, filed on Jul. 8, 2015, and which is hereby incorporated by reference as if it is set forth in full in this specification, and which also claims the benefit of Chinese Patent Application No. 201410340366.3, filed on Jul. 17, 2014, which is incorporated herein by reference in its entirety.

FIELD OF THE INVENTION

The present disclosure relates to the field of switching power supplies, and more particularly to control methods and circuits for improving a dynamic response of a switching power supply.

BACKGROUND

A switching power supply may typically include a power stage circuit and a control circuit. The control circuit can be used to regulate on and off times of a power switch in a switch-type converter based on variations of an input voltage, various internal parameters, and a load, so as to maintain an output voltage or an output current of the switching power supply as substantially constant. Therefore, control approaches are very important to the design of a switching power supply, and may affect the performance thereof. Different power supply results may be achieved with different detection signals and/or different control circuits.

SUMMARY

In one embodiment, a method of controlling an isolated converter, can include: (i) sampling and holding an output voltage of the isolated converter during a present switching cycle to generate a reference voltage signal that is proportional to the output voltage, where the isolated converter comprises a transformer having primary and secondary windings, a power switch coupled to the primary winding, and a rectifying device coupled to the secondary winding; (ii) comparing, in a predetermined time interval before a next switching cycle, the output voltage against the reference voltage signal, and activating a wake-up signal when the output voltage is less than the reference voltage signal, in order to control a voltage at the secondary winding to represent a variation of the output voltage; (iii) detecting a voltage of the primary winding or the secondary winding, and generating a voltage detection signal; and (iv) controlling the power switch according to the voltage detection signal, in order to maintain the output voltage as an expected voltage.

In one embodiment, a control circuit for an isolated converter, can include: (i) a voltage feedback circuit configured to sample and hold an output voltage of the isolated converter during a present switching cycle, and to generate a reference voltage signal that is in proportional to the output voltage, where the isolated converter comprises a transformer having primary and secondary windings, a power switch coupled to the primary winding, and a rectifying device coupled to the secondary winding; (ii) the voltage feedback circuit being configured, in a predetermined time interval before a next switching cycle, to compare the output voltage against a reference voltage signal, and to activate a wake-up signal when the output voltage is less than the reference voltage signal, in order to control a voltage at the secondary winding to represent a variation of the output voltage; (iii) a voltage detection circuit configured to detect a voltage of the primary winding or the secondary winding, and to generate a voltage detection signal; and (iv) a primary controller configured to control the power switch according to the voltage detection signal, and to maintain the output voltage as an expected voltage.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Primary-controlled switching power supplies, such as primary-controlled flyback converters are widely applied in fields of light-emitting diode (LED) drivers, battery chargers, adapters and so on, because of its advantages of relatively simple circuit structure, good safety performance, and good stability. Typically, a delay time can occur, and a primary-side controller may only indirectly (and not in real time) sample a secondary-side output voltage by detecting a voltage of an auxiliary winding in each switching cycle.

Figure 1:
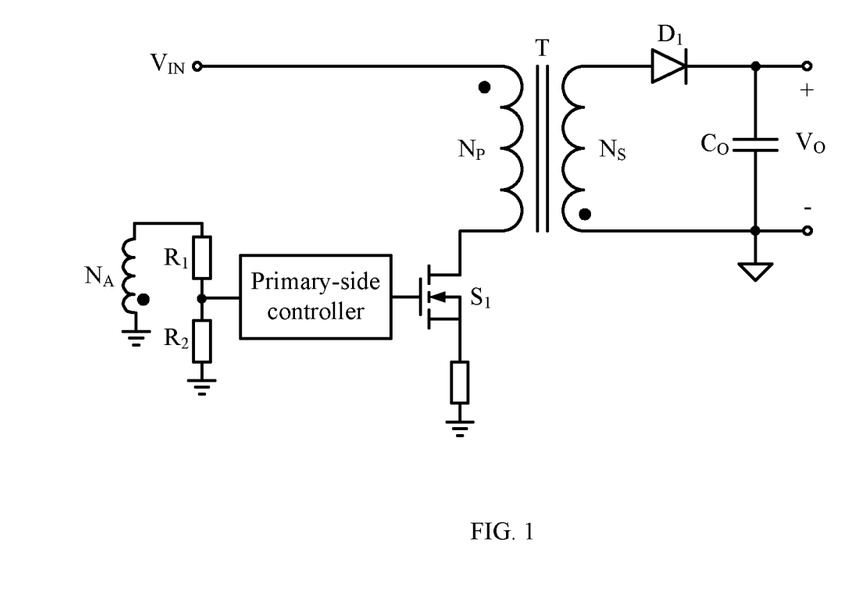
FIG. 1 is a schematic block diagram of an example primary control approach.

Referring now to FIG. 1, shown is a schematic block diagram of an example primary control approach. In a primary-controlled circuit, an output voltage may fall when a load is switched from relatively light-load or no-load condition to a relatively heavy-load or full-load condition. A primary-side controller may not accurately represent a variation on the output voltage accurately. Instead, the variation may be detected from the voltage of the auxiliary winding in the next switching cycle. Therefore, when the circuit operates with a relatively low frequency and a light-load, because the switching cycle is relatively long and the output voltage may not be adjustable before the next switching cycle arrives, the output voltage may fall substantially when the load is switched between different load states. As a result, the dynamic performance of the circuit may be relatively poor.

In one embodiment, a control circuit for an isolated converter, can include: (i) a voltage feedback circuit configured to sample and hold an output voltage of the isolated converter during a present switching cycle, and to generate a reference voltage signal that is in proportional to the output voltage, where the isolated converter comprises a transformer having primary and secondary windings, a power switch coupled to the primary winding, and a rectifying device coupled to the secondary winding; (ii) the voltage feedback circuit being configured, in a predetermined time interval before a next switching cycle, to compare the output voltage against a reference voltage signal, and to activate a wake-up signal when the output voltage is less than the reference voltage signal, in order to control a voltage at the secondary winding to represent a variation of the output voltage; (iii) a voltage detection circuit configured to detect a voltage of the primary winding or the secondary winding, and to generate a voltage detection signal; and (iv) a primary controller configured to control the power switch according to the voltage detection signal, and to maintain the output voltage as an expected voltage.

Figure 2:
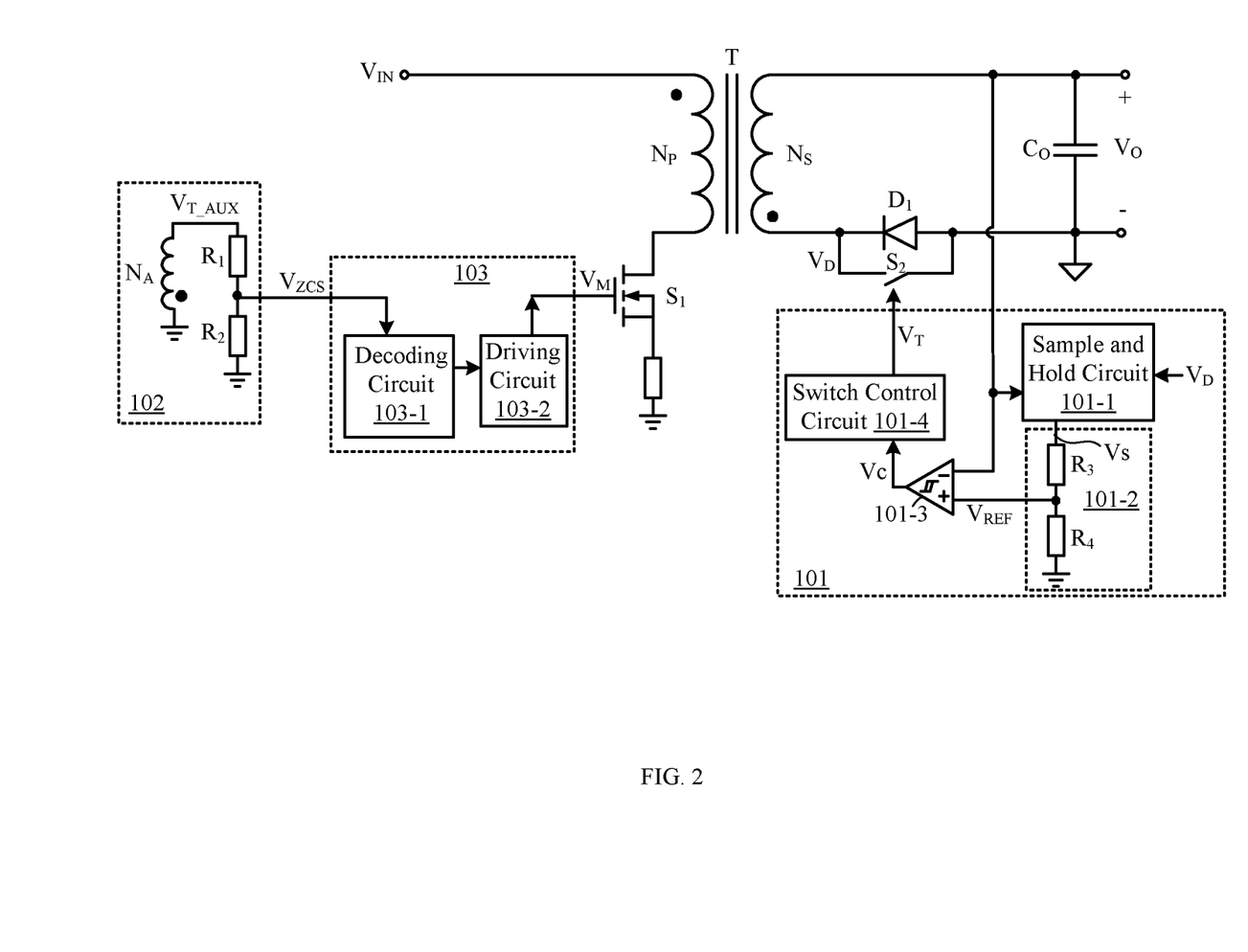
FIG. 2 is a schematic block diagram of a first example control circuit for improving dynamic response, in accordance with embodiments of the present invention.

Referring now to FIG. 2, shown is a schematic block diagram of a first example control circuit for improving dynamic response, in accordance with embodiments of the present invention. In this particular example, the control circuit may be applied in an isolated converter (e.g., a flyback converter) that receives input voltage $V_{IN}$ and provides substantially stable output voltage $V_O$ to a load. The flyback converter can include a transformer with primary winding Np and secondary winding Ns, power switch $Q_M$ that can connect to primary winding Np, and a rectifying device that can connect to secondary winding Ns. In this particular example, diode $D_1$ may be utilized as the rectifying device with the cathode connected to secondary winding Ns, and the anode grounded.

For example, the control circuit can include voltage feedback circuit 101, voltage detection circuit 102, and primary-side controller 103. The control circuit can also include switch $S_2$ connected in parallel with diode $D_1$. In another example, a synchronizing switch (e.g., a field effect transistor) can be used as the rectifying device. The field effect transistor may have a drain connected to the secondary winding, a source that is grounded, and a gate that receives the same signal as that of switch $S_2$.

In this particular example, in any time interval of each switching cycle, voltage feedback circuit 101 may sense and maintain output voltage $V_O$ of the isolated converter, and can generate reference voltage signal $V_{REF}$ that is proportional to output voltage $V_O$. The exact moment in time (or sampling point) for sampling output voltage $V_O$ can be set depending on the particular circuit configuration. For example, the sampling time point can be the turn-on moment of the primary-side power switch, or the turn-on moment of the secondary-side rectifying device. Thereafter, in a time interval before the next switching cycle, voltage feedback circuit 101 can compare output voltage $V_O$ against reference voltage signal $V_{REF}$. When the output voltage is less than the reference voltage signal, a wake-up signal $V_T$ may be activated (e.g., a pulse generated) in order to control the voltage of the secondary winding that represents the variation of the output voltage.

For example, voltage feedback circuit 101 can include sample and hold circuit 101-1, bleeding circuit 101-2, comparison circuit 101-3, and switch control circuit 101-4. Sample and hold circuit 101-1 can receive output voltage $V_O$ of the isolated converter and voltage signal $V_D$ at a first terminal of the rectifying device (e.g., the cathode voltage of diode $D_1$). When voltage signal $V_D$ indicates that rectifying device $D_1$ is turning on, sample and hold circuit 101-1 may sample and hold the output voltage of the isolated converter in order to generate sense signal $V_S$. Those in the art will recognize that the sample and hold circuit may be implemented by a circuit that includes a resistor and a capacitor; however, other appropriate sample and hold circuitry can also be applied in particular embodiments. Bleeding circuit 101-2 can receive sense signal $V_S$, and may generate reference voltage signal $V_{REF}$ by dividing sense signal $V_S$. Bleeding circuit 101-2 can include resistors $R_3$ and $R_4$ connected in series.

Comparison circuit 101-3 can receive reference voltage signal $V_{REF}$ and output voltage $V_O$. In a predefined time interval before a next switching cycle, comparison circuit 101-3 can compare output voltage $V_O$ against reference voltage signal $V_{REF}$, and may activate comparison signal $V_C$ when the output voltage is less than the reference voltage signal. Comparison circuit 101-3 can include a comparator, such as a hysteresis comparator, with an inverting input terminal that receives output voltage $V_O$, a non-inverting input terminal that receives reference voltage signal $V_{REF}$, and an output terminal that generates comparison signal $V_C$.

Switch control circuit 101-4 can receive comparison signal $V_C$ and may generate wake-up signal $V_T$. For example, the wake-up signal may be a pulse signal, or a group of pulse signals, each with a predetermined pulse width that can be generated by a pulse signal generator. For example, the pulse signal generator may generate a pulse signal with a predetermined pulse width, and may be triggered by comparison signal $V_C$. Wake-up signal $V_T$ can be used to control the switching state of switch $S_2$, so as to control the variation of the voltage of the secondary winding, and the voltage signal of the secondary winding can represent the variation of the output voltage.

Voltage detection circuit 102 can detect the voltage of primary winding Np or secondary winding Ns, and may generate voltage detection signal $V_{ZCS}$. Voltage detection circuit 102 can include auxiliary winding $N_A$ and a bleeding circuit that includes resistors $R_1$ and $R_2$. Auxiliary winding $N_A$ can be coupled to primary winding Np or secondary winding Ns, in order to obtain voltage signal $V_{T\_AUX}$ across the auxiliary winding. The bleeding circuit including resistors $R_1$ and $R_2$ can receive voltage signal voltage signal $V_{T\_AUX}$, and may generate voltage detection signal $V_{ZCS}$ by dividing voltage signal voltage signal $V_{T\_AUX}$. Based on operating principles of the flyback converter, voltage signal voltage signal $V_{T\_AUX}$ obtained by coupling can reflect the variation of the output voltage, as the voltage of the secondary winding can reflect the variation of the output voltage. Therefore, voltage detection signal $V_{ZCS}$ may be used to represent the variation of the output voltage.

Primary controller 103 can receive voltage detection signal $V_{ZCS}$, and the variation of the output voltage can be determined by appropriate decoding. For example, when the output voltage is less than a predetermined voltage, switching signal $V_M$ can control power switch $Q_M$ to turn on, in order to maintain the energy transferred from the primary-side to the secondary-side, and to maintain the output voltage as substantially equal to the predetermined voltage. Primary controller 103 can include pulse signal detection and decoding circuit 103-1 and driving circuit 103-2. Pulse signal detection and decoding circuit 103-1 can receive voltage detection signal $V_{ZCS}$, and may generate a pulse driving signal. The pulse driving signal can be activated when the secondary-side output voltage is determined to be less than the predetermined output voltage (e.g., after voltage detection signal $V_{ZCS}$ is detected/decoded). Driving circuit 103-2 can receive the pulse signal driving signal, and may generate switching signal $V_M$ to control the power switch to be turned on.

Figure 3:
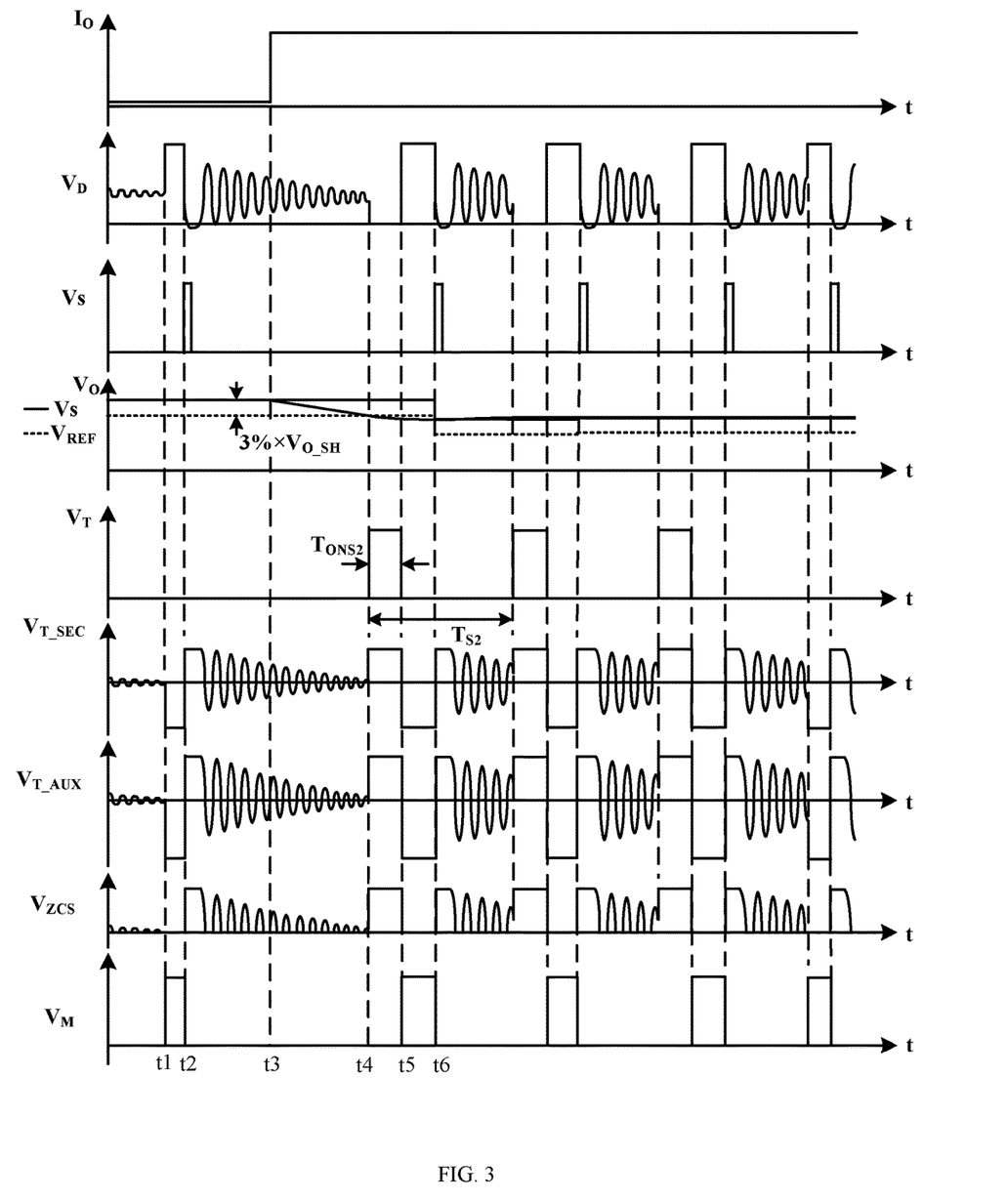
FIG. 3 is a waveform diagram showing example operation of the circuit shown in FIG. 2, in accordance with embodiments of the present invention.

Referring now to FIG. 3, shown is a waveform diagram of example operation of the circuit shown in FIG. 2, in accordance with embodiments of the present invention. At time t1 (e.g., the initial time of a switching cycle), switching signal $V_M$ for the power switch at the primary-side can go high, power switch $Q_M$ may be turned on, diode $D_1$ at the secondary-side can be off, and cathode voltage $V_D$ of the diode may be high. Also, output current $I_O$ may be close to zero when the load is in a light-load or no load condition, and output voltage $V_O$ may be a predetermined voltage. Also shown are example waveforms of voltage $V_{T\_SEC}$ of the secondary winding, voltage signal $V_{T\_AUX}$ of the auxiliary winding, and voltage detection signal $V_{ZCS}$.

At time t2, switching signal $V_M$ may go low, power switch $Q_M$ at the primary-side can be off, and diode $D_1$ at the secondary-side may be on. The load can be powered by a circuit loop made up of the secondary winding, filter capacitor Co, and diode $D_1$. In such a case, cathode voltage $V_D$ of diode $D_1$ may immediately drop to be less than zero. Sample and hold circuit 101-1 can sample and hold the present output voltage in order to generate sense signal $V_S$. Also, reference voltage signal $V_{REF}$ can be generated by bleeding circuit 101-2. For example, reference voltage signal can be about 97% of sense signal $V_S$, and the value of the sense signal can be substantially equal to the output voltage at time t2.

Thereafter, at time t3, when the load switches from light-load or no-load to a heavy-load or full-load state, output current $I_O$ may rise, and output voltage $V_O$ can drop. Based on the above description of the control circuit, during the time interval prior to the next time period (e.g., from time t3 to time t4), comparison circuit 101-3 can compare output voltage $V_O$ against reference voltage signal $V_{REF}$, and may activate comparison signal $V_C$ when output voltage $V_O$ is detected to be less than reference voltage signal $V_{REF}$. At time t4, switch control circuit 101-4 may generate a pulse signal (or a group of pulse signals) with a predetermined width as wake-up signal $V_T$ according to comparison signal $V_C$.

Wake-up signal $V_T$ can be used to control the switching state of switch $S_2$. As shown in FIG. 3, the active width of wake-up signal $V_T$ is $T_{ONS2}$, and switch $S_2$ can be turned on when wake-up signal $V_T$ is high. The voltage of the secondary winding can be high, so the voltage of the secondary winding can represent the drop voltage of the output voltage. The time period corresponding to voltage detection signal $V_{ZCS}$ can also be high. Also, pulse signal detection and decoding circuit 103-1 at the primary-side can detect that voltage detection signal $V_{ZCS}$ remains high for a predetermined time period (e.g., consistent with the predetermined active width of wake-up signal $V_T$).

At time t5, when the output voltage at the secondary-side drops to be less than reference voltage signal $V_{REF}$, pulse signal detection and decoding circuit 103-1 may activate a pulse driving signal. Driving circuit 103-2 may receive the pulse driving signal, and generate switching signal $V_M$ to turn on power switch $S_1$. At the moment that the current switching cycle is complete and the next switching cycle begins, the power switch at the primary-side can be turned on. At time t6, power switch $S_1$ can be turned off, the rectifying device at the secondary-side can be turned on, sample and hold circuit 101-1 can sample and maintain the current output voltage, so as to keep output voltage $V_O$ at the expected voltage. Further, the output voltage under the heavy-load condition is different from under a light-load condition and the output voltage drop a little because of the system response time in such a case.

In this way, by applying a control circuit with such a particularly designed voltage feedback circuit for improving dynamic response, the maximum drop voltage of the output voltage can be related to the output voltage that is sensed in the current switching cycle under dynamic load conditions. Accordingly, the reference voltage signal may not be a fixed value, but rather is a value that is related to the output voltage. Therefore, a relatively small threshold value can be set in order to significantly improve the system response speed, such that the system dynamic performance can be improved.

As those skilled in the art will recognize, diode $D_1$ can be coupled to the other terminal of the secondary winding from that of the example shown in FIG. 2. In this case, the anode of the diode can be connected to the secondary winding, and the cathode can be connected to the output terminal of the flyback converter. Thus, the turn-on moment of the diode can be determined by detecting the anode voltage thereof, while the sense signal can be obtained in the same general fashion.

Figure 4:
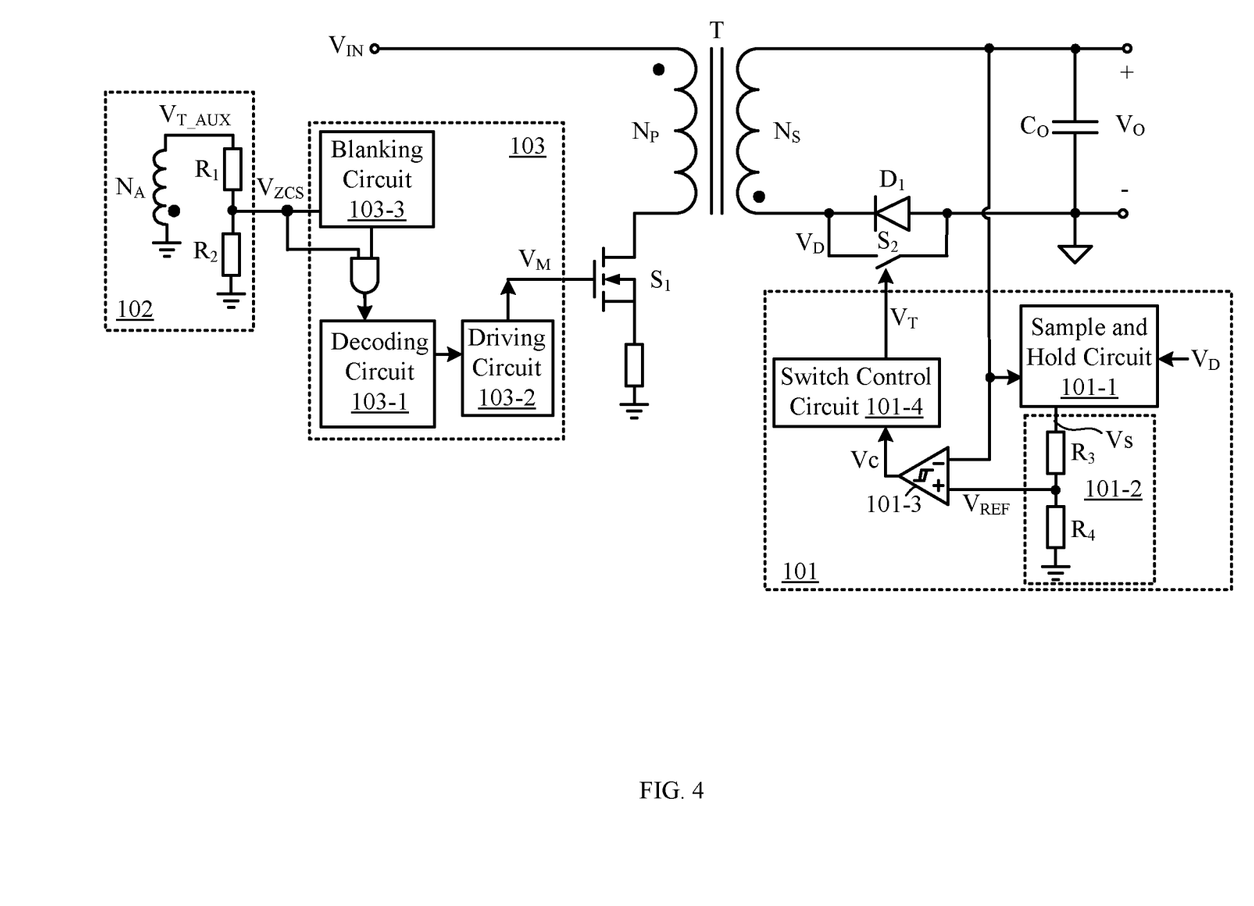
FIG. 4 is a schematic block diagram of a second example control circuit for improving dynamic response, in accordance with embodiments of the present invention.

Referring now to FIG. 4, shown is a schematic block diagram of a second example control circuit for improving dynamic response, in accordance with embodiments of the present invention. In this particular example, primary-side control circuit 103 can also include blanking circuit 103-3 that receives voltage detection signal $V_{ZCS}$, and may generate a blanking signal (e.g., with a predetermined width) according to the voltage detection signal. For example, the blanking signal can be generated at each rising edge or each falling edge of the voltage detection signal. Further, pulse signal detection and decoding circuit 103-1 can stop detecting voltage detection signal $V_{ZCS}$ when the blanking signal is active. In this way, adverse detection accuracy effects due to the resonance of voltage detection signal $V_{ZCS}$ can be substantially avoided by utilizing an inverted version of the blanking signal and the voltage detection signal.

In one embodiment, a method of controlling an isolated converter, can include: (i) sampling and holding an output voltage of the isolated converter during a present switching cycle to generate a reference voltage signal that is proportional to the output voltage, where the isolated converter comprises a transformer having primary and secondary windings, a power switch coupled to the primary winding, and a rectifying device coupled to the secondary winding; (ii) comparing, in a predetermined time interval before a next switching cycle, the output voltage against the reference voltage signal, and activating a wake-up signal when the output voltage is less than the reference voltage signal, in order to control a voltage at the secondary winding to represent a variation of the output voltage; (iii) detecting a voltage of the primary winding or the secondary winding, and generating a voltage detection signal; and (iv) controlling the power switch according to the voltage detection signal, in order to maintain the output voltage as an expected voltage.

Figure 5:
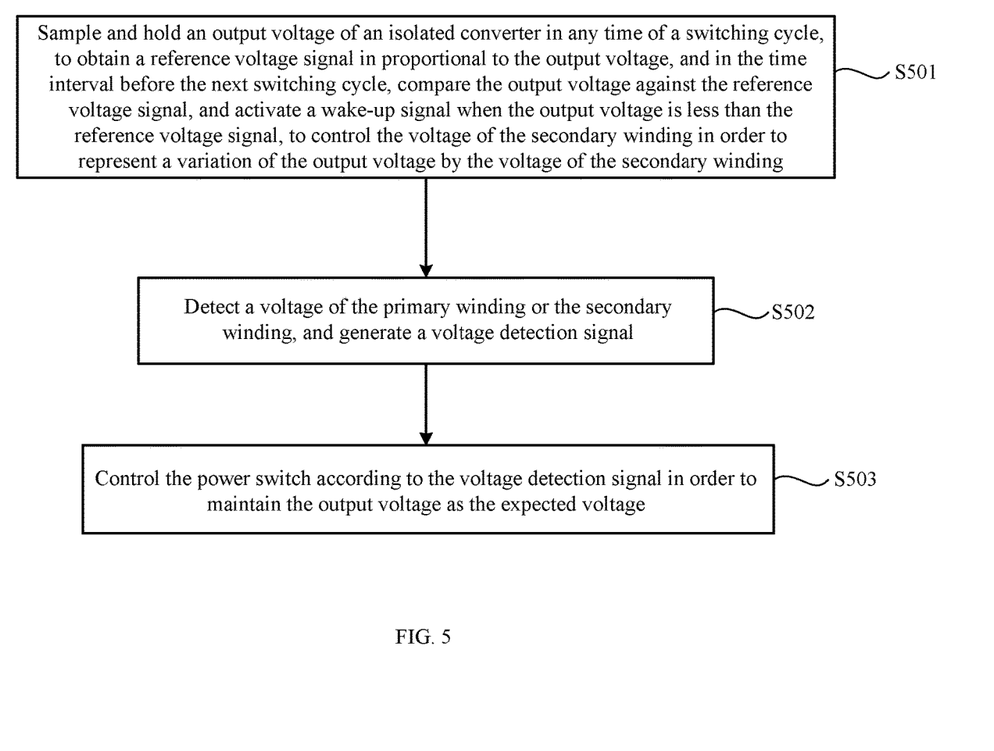
FIG. 5 is a flow diagram of an example method of improving dynamic response, in accordance with embodiments of the present invention.

Referring now to FIG. 5, shown is a flow diagram of an example method of improving dynamic response, in accordance with embodiments of the present invention. At 501, an output voltage (e.g., $V_O$) of an isolated converter can be sampled and held in any time of a switching cycle, in order to obtain a reference voltage signal (e.g., $V_{REF}$) that is in proportional to the output voltage. In a time interval (e.g., from time t3 to time t4) before the next switching cycle, the output voltage can be compared against the reference voltage signal, and a wake-up signal can be activated when the output voltage is less than the reference voltage signal. This can control the voltage of the secondary winding in order to represent the variation of the output voltage by the voltage of the secondary winding.

At 502, a voltage of the primary winding or the secondary winding can be detected, and a voltage detection signal (e.g., $V_{ZCS}$) may be generated. At 503, the power switch (e.g., $S_1$) can be controlled according to the voltage detection signal, in order to maintain the output voltage as substantially the expected voltage. Furthermore, the output voltage can be obtained by sampling and holding in order to obtain a reference voltage signal that is in proportional to the output voltage. Also, the wake-up signal (e.g., $V_T$) can be a pulse signal, or a group of pulse signals, each with a predetermined pulse width. In addition, the control method can also include receiving the voltage detection signal, and generating a blanking signal with a predetermined active width according to the voltage detection signal, while disabling detection of the voltage detection signal when the blanking signal is active.

Particular embodiments can also include a switching power supply having a transformer with primary and secondary windings, a power switch connected to the primary winding, a rectifying device connected to the secondary winding, and a control circuit as described above for improving dynamic response. In addition, a switching power supply of certain embodiments can improve the system dynamic response, and may reduce the drop voltage of the output voltage.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling an isolated converter, the method comprising:
    a) determining whether an output voltage of said isolated converter has decreased by a predetermined percentage, wherein said isolated converter comprises a transformer having primary and secondary windings, and a power switch coupled to said primary winding;
    b) activating a wake-up signal when said output voltage has decreased by said predetermined percentage;
    c) controlling a secondary voltage across said secondary winding in accordance with said wake-up signal; and
    d) controlling an on state of said power switch to prevent the decrease of said output voltage in accordance with the voltage variation of said secondary voltage to improve transient response.

2. The method of claim 1, wherein said secondary voltage representing a variation of said output voltage is controlled by said wake-up signal.

3. The method of claim 1, wherein said wake-up signal comprises a pulse signal with a predetermined pulse width.

4. The method of claim 1, further comprising:
    a) generating a blanking signal with a predetermined active width according to said voltage detection signal; and
    b) disabling detection of said voltage detection signal when said blanking signal is active.

5. A control circuit for an isolated converter, the control circuit comprising:
    a) a voltage feedback circuit configured to determine whether an output voltage of said isolated converter comprising a transformer having primary and secondary windings, and a power switch coupled to said primary winding has decreased by a predetermined percentage, and to activate a wake-up signal when said output voltage has decreased by said predetermined percentage;
    b) a secondary control circuit configured to control a secondary voltage across said secondary winding in accordance with said wake-up signal; and
    c) a primary-side controller configured to control an on state of said power switch to prevent the decrease of said output voltage in accordance with the voltage variation of said secondary voltage to improve transient response.

6. The control circuit of claim 5, wherein said wake-up signal comprises a pulse signal having a predetermined pulse width.

7. The control circuit of claim 5, wherein a rectifying device of said isolated converter is configured as a diode, a switch is coupled in parallel with said diode, and said wake-up signal is configured to control said switch to control a voltage of said secondary winding.

8. The control circuit of claim 5, wherein a rectifying device of said isolated converter is configured as a transistor, and said wake-up signal is configured to control said transistor to control said secondary voltage.

9. The control circuit of claim 5, wherein said voltage detection circuit comprises:
    a) an auxiliary winding coupled to said primary winding or said secondary winding, and being configured to obtain a first voltage signal; and
    b) a bleeding circuit configured to generate said voltage detection signal by dividing said first voltage signal.

10. The control circuit of claim 5, wherein said primary-side controller comprises:
    a) a pulse signal detection and decoding circuit configured to receive said voltage detection signal, and to activate a pulse driving signal when said output voltage is determined to be less than said expected voltage; and
    b) a driving circuit configured to receive said pulse driving signal, and to generate a switching signal to control said power switch.

11. The control circuit of claim 5, wherein said primary-side controller further comprises:
    a) a blanking circuit configured to receive said voltage detection signal, and to generate a blanking signal having a predetermined width; and
    b) a pulse signal detection and decoding circuit configured to disable detection of said voltage detection signal when said blanking signal is active.

12. A switching power supply, comprising the control circuit of claim 5, and further comprising:

a) said transformer;
b) said power switch coupled to said primary winding; and
c) said rectifying device coupled to said secondary winding.

13. The control circuit of claim 5, wherein said voltage feedback circuit comprises:
   a) sampling and holding circuit configured to sample and hold said output voltage to generate a reference voltage signal; and
   b) comparison circuit configured to compare said output voltage against said reference voltage signal to activate a wake-up signal when said output voltage is less than said reference voltage signal.

14. The control circuit of claim 13, wherein a ratio between said reference voltage signal and said output voltage is determined in accordance with said predetermined percentage.

15. The control circuit of claim 13, wherein the comparison between said output voltage and said reference voltage signal occurs prior to a next sampling and holding operation of said output voltage.

16. The control circuit of claim 5, wherein said wake-up signal is configured to control an operation of a switching device coupled to said secondary winding.

17. The control circuit of claim 5, wherein said secondary voltage representing a variation of said output voltage is controlled by said wake-up signal.

18. The method of claim 1, wherein said determining whether said output voltage has decreased by said predetermined percentage comprises:
   a) sampling and holding said output voltage to generate a reference voltage signal;
   b) comparing said output voltage against said reference voltage signal; and
   c) activating said wake-up signal when said output voltage is less than said reference voltage signal, wherein a ratio between said reference voltage signal and said output voltage is determined in accordance with said predetermined percentage.

19. The method of claim 18, wherein said comparing said output voltage against said reference voltage signal occurs prior to a next sampling and holding operation of said output voltage.

20. The method of claim 18, wherein said wake-up signal is configured to control an operation of a switching device coupled to said secondary winding.

21. The method of claim 20, wherein when a rectifying device of said isolated converter is configured as a diode, a switch is coupled in parallel to said diode to form said switching device, and said wake-up signal is configured to control said switch to control said secondary voltage.

22. The method of claim 20, wherein when said rectifying device is configured as a transistor to form said switching device, said wake-up signal is configured to control said transistor to control said secondary voltage.

23. The method of claim 18, wherein said sampling and holding said output voltage to generate a reference voltage signal occurs when a rectifying device of said isolated converter is turned on.

* * * * *